(12) United States Patent
Park

(10) Patent No.: US 6,397,701 B1
(45) Date of Patent: Jun. 4, 2002

(54) INTEGRAL MOUNTING STRUCTURE FOR A STEERING GEARBOX AND POWERTRAIN

(75) Inventor: Yong-Beom Park, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/576,579

(22) Filed: May 22, 2000

(30) Foreign Application Priority Data

Jun. 22, 1999 (KR) ............................................. 99-23435

(51) Int. Cl.[7] ............................ F16H 57/02; B62D 1/18; B62D 1/11
(52) U.S. Cl. ...................... 74/606 R; 280/777; 280/775
(58) Field of Search ............................... 74/606 R, 498, 74/492, 493, 388 PS; 280/777, 775, 87 R; 180/82

(56) References Cited

U.S. PATENT DOCUMENTS

| | | | | |
|---|---|---|---|---|
| 3,578,782 A | * | 5/1971 | Takeomi | 180/82 |
| 3,672,697 A | * | 6/1972 | Knowles | 280/87 A |
| 3,929,030 A | * | 12/1975 | Sukeshita | 74/492 |
| 3,934,896 A | * | 1/1976 | Barenyl | 280/87 R |
| 4,655,475 A | * | 4/1987 | Van Gelderen | 280/777 |
| 5,613,709 A | * | 3/1997 | Nakamichi | 280/777 |
| 6,237,954 B1 | * | 5/2001 | Sato et al. | 280/775 |

FOREIGN PATENT DOCUMENTS

| | | | | |
|---|---|---|---|---|
| JP | 8-216897 | * | 8/1996 | 74/498 |

* cited by examiner

Primary Examiner—Vinh T. Luong
(74) Attorney, Agent, or Firm—Christie, Parker & Hale, LLP

(57) ABSTRACT

An integral mounting structure for a steering gearbox and a powertrain housing is provided. The structure has a mounting seat integrally formed on a cross member of a vehicle, the mounting seat including a first concave portion forming a half cylinder, a roll mounting bracket having mounting holes through which the roll mounting bracket is attached to the mounting seat using fasteners. The structure also has a second concave portion forming a half cylinder such that the first concave portion of the mounting seat forms a full cylindrical shape with the second concave portion of the roll mounting bracket for accommodating a column of the steering gearbox. The structure also has a roll stopper bracket including a plurality of powertrain mounting holes for mounting a rear part of the powertrain housing.

5 Claims, 3 Drawing Sheets

INTEGRAL MOUNTING STRUCTURE FOR A STEERING GEARBOX AND POWERTRAIN

CROSS REFERENCE TO RELATED APPLICATIONS

This application claims priority of Korean Application No. 99-23435 filed Jun. 22, 1999.

BACKGROUND OF THE INVENTION (a) Field of the Invention

The present invention relates to an integral mounting structure for a steering gearbox and a powertrain. More particularly, the present invention relates to a structure in which a mounting bracket, which is used to mount a steering gearbox to a vehicle body, and a roll mounting bracket, which mounts a rear portion of a powertrain to the vehicle body, are integrally formed, thereby simplifying the overall mounting structure, enhancing the free layout design, and minimizing production costs.

(b) Description of the Related Art

A steering system for enabling the driver to control the driving direction of the vehicle and a powertrain for transmitting a power generated by an engine to drive wheels are generally mounted in an engine compartment. Here, the steering system includes a handling portion, a link portion, and a steering gearbox, the steering gearbox changing a direction in which the handling portion moves and transmitting the movement to the link portion. Also, the powertrain includes a transmission, a clutch, and a differential, with the rear-wheel drive vehicle further including a driveshaft and a propeller shaft.

All such structural elements must be mounted to the vehicle body in such a manner that they do not move as a result of shocks and vibrations normally generated with the operation of the vehicle. Further, since serious consequences result if some of these elements become detached, special mounting members are used to more securely fix the elements to the vehicle body.

In the case of the steering gearbox and a housing of the powertrain, mounting members used for each of these elements perform the dual function of securely fixing the elements to the vehicle body, as well as minimizing the transmission of vibrations generated by the steering gearbox and the powertrain to the vehicle body. A column of the steering gearbox and a rear portion of the powertrain housing are typically mounted adjacent to one another on a cross member provided on a bottom portion of the vehicle.

The conventional mounting structure of the column of the steering gearbox and the rear portion of the powertrain housing is shown in FIGS. 3 through 5.

A column 36 of a steering gearbox 34 and a rear portion of a powertrain housing are fixed to a cross member 32 of a vehicle body frame. The column 36 of the steering gearbox 34, as shown in FIG. 3, is mounted to the cross member 32 by a mounting bracket 38 with a mounting boss 35a interposed between the cross member 32 and the column 36. The rear portion of the powertrain housing, with reference to FIG. 4, is mounted on a mounting boss 35b and a center member 42, both provided on the cross member 32, with roll mounting brackets 40a and 40b respectively interposed therebetween.

If the steering gearbox and the powertrain are mounted with separate mounting members as described above, overall production costs are increased by the extra materials and fabrication time required to manufacture each mounting member. Also, the overall structure is complicated and maintenance is difficult.

Also, since the mounting bracket of the steering gearbox and the roll mounting brackets of the powertrain housing must occupy different locations so that the powertrain housing and steering gearbox do not interfere with one another, the free layout design is reduced. Additionally, because the powertrain is mounted above the steering gearbox, rolling of the powertrain housing reduces the durability of the steering gearbox.

Further, performing maintenance work on the steering gearbox is difficult because of its proximity to the transmission as shown in FIG. 5. That is, because of the proximity of the steering gearbox to the transmission and the fact that the steering gearbox is removed by manipulating the same in a direction toward the transmission (after all connecting parts are loosened), it is difficult to remove the steering gearbox for repairs.

Finally, if the roll mounting brackets of the powertrain housing are mounted on the center member, the powertrain comes to be mounted in a relatively low position. As a result, the powertrain generates a significant amount of noise and vibration.

SUMMARY OF THE INVENTION

The present invention has been made in an effort to solve the above problems.

It is an object of the present invention to provide an integral mounting structure for a steering gearbox and a powertrain such that an overall mounting structure is simplified, a free layout design is improved, production costs are minimized, and a durability of mounting members is increased.

To achieve the above object, the present invention provides an integral mounting structure for a steering gearbox and a powertrain comprising a mounting seat integrally formed on a cross member of a vehicle, the mounting seat including a first concave portion forming a half cylinder in a direction of the cross member and first mounting holes formed on each side of the first concave portion; a roll mounting bracket having (a) second mounting holes through which the roll mounting bracket is attached to the mounting seat using a bolt or other fastening member, (b) a second concave portion forming a half cylinder in the direction of the cross member such that the first concave portion of the mounting seat forms a full cylindrical shape with the second concave portion of the roll mounting bracket, a column of the steering gearbox passing through the full cylindrical shape and (c) a formed bolt hole passing through an upper portion of the roll mounting bracket; and a roll stopper bracket including (a) fastening holes through which the roll stopper bracket is connected to the bolt hole of the roll mounting bracket, and (b) a plurality of powertrain mounting holes, a rear part of the powertrain housing being mounted to the powertrain mounting holes.

According to a feature of the present invention, a bushing is provided in the full cylindrical shape.

According to another feature of the present invention, the bushing being made of a material able to provide cushioning to the column of the steering gearbox.

According to yet another feature of the present invention, the roll stopper bracket is connected to the bolt hole of the roll mounting bracket using a bolt, nut and washer assembly.

According to still yet another feature of the present invention, the second mounting holes are formed with female threads and at a predetermined distance inward from an end contacting the mounting seat, and openings are formed in the cross member at portions corresponding to the formation of the first mounting holes of the mounting seat such that bolts or other such fastening members can be inserted through the openings to pass through the first mounting holes and be screwed into the second mounting holes.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
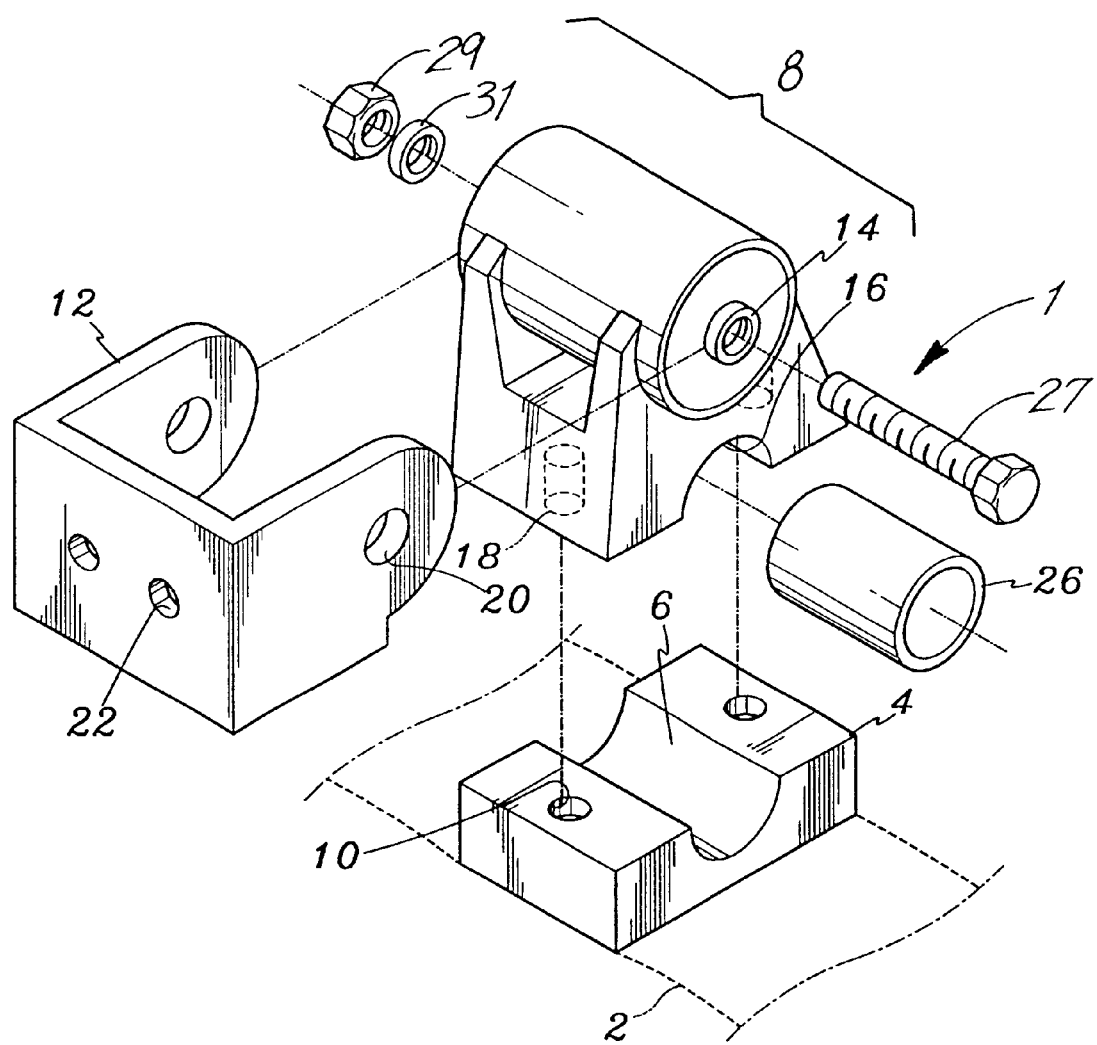
FIG. 1 is an exploded perspective view of an integral mounting structure according to a preferred embodiment of the present invention.
Figure 2:
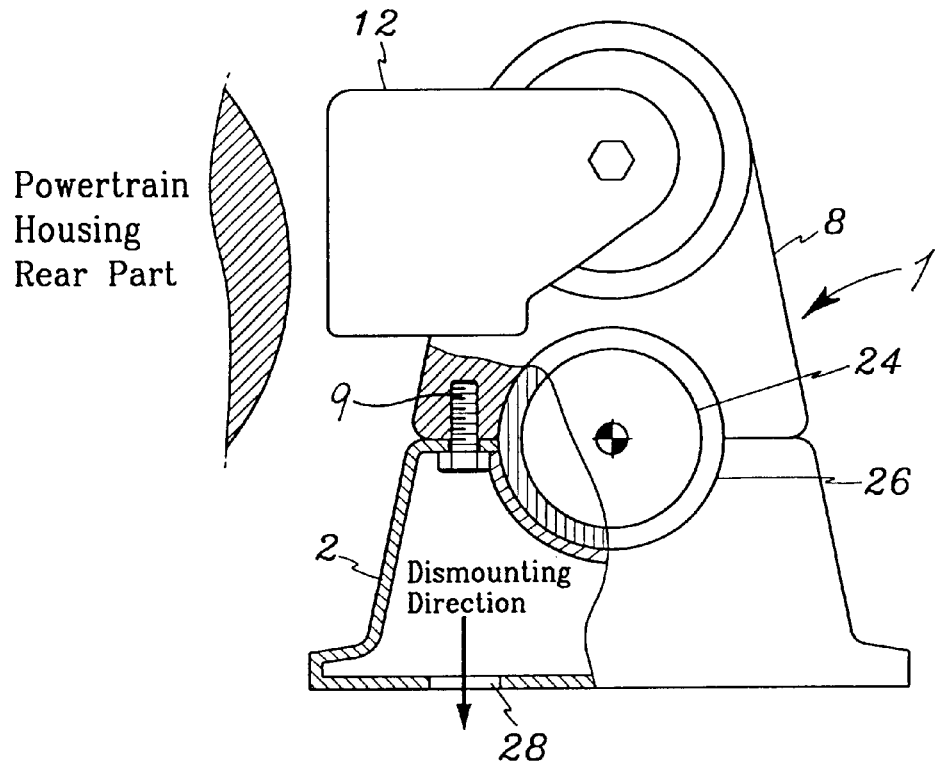
FIG. 2 is a partial cutaway side view of the integral mounting structure shown in FIG. 1 in an assembled state.
Figure 3:
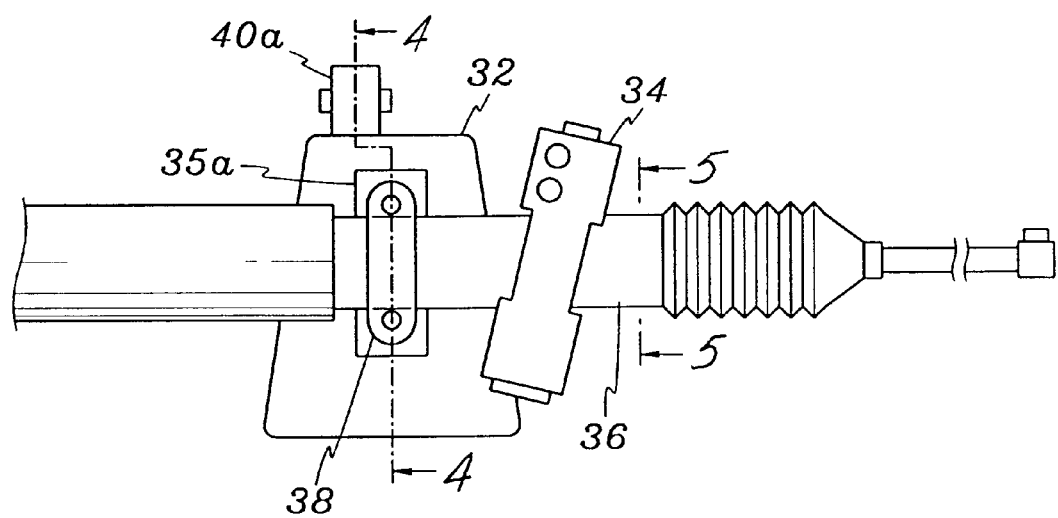
FIG. 3 is a front view of conventional mounting elements for a steering gearbox and a powertrain.
Figure 4:
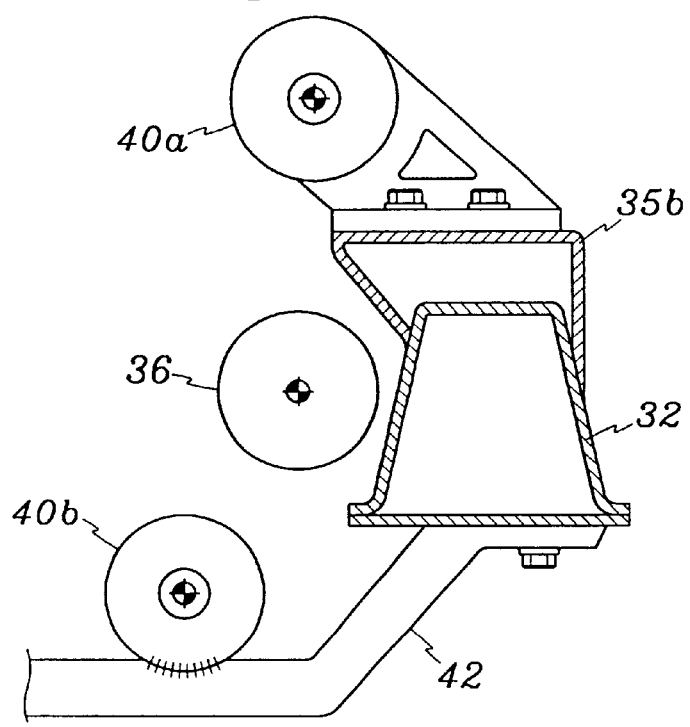
FIG. 4 is a sectional view taken along line 4—4 of FIG. 3.
Figure 5:
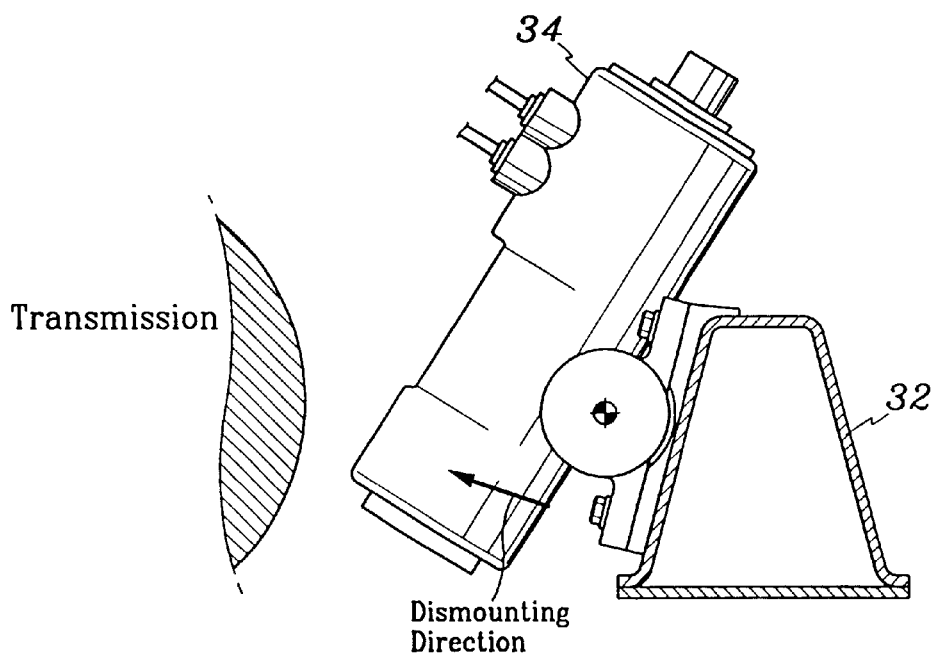
FIG. 5 is a sectional view taken along line 5—5 of FIG. 3.

FIG. 1 shows an exploded perspective view of an integral mounting structure 1 according to a preferred embodiment of the present invention, and FIG. 2 shows a partial cutaway side view of the integral mounting structure shown in FIG. 1 in an assembled state. Reference numeral 2 in the drawings indicates a cross member.

Each end of the cross member 2 is fixed to a side member (not shown), the two side members being provided in a longitudinal direction along a bottom of both sides of a vehicle body.

Mounting seats are integrally provided on an upper face of the cross member 2 to enable the fixing of various types of mounting members. Among the mounting seats formed on the cross member 2 is a mounting seat 4 used for a steering gearbox and a rear part of a powertrain housing. Accordingly, the mounting seat 4 is formed on a portion of the cross member 2 corresponding to a position of the steering gearbox and the rear part of the powertrain housing.

A first concave portion 6 is formed along a width of the mounting seat 4 at a center portion thereof. The first concave portion 6 is formed in the shape of a half cylinder. A first mounting hole 10 is formed to each side of the first concave portion 6 through the mounting seat 4 such that a roll mounting bracket 8 can be fixed to the mounting seat 4.

The roll mounting bracket 8 includes second mounting holes 18 extending upward a predetermined distance from a bottom of the roll mounting bracket 8, and a second concave portion 16 in the shape of a half cylinder. When the roll mounting bracket 8 is mounted to the mounting seat 4, positions of the first mounting holes 10 correspond to positions of the second mounting holes 18, and a position of the first concave portion 6 corresponds to a position of the second concave portion 16 to form a full cylindrical shape.

The roll mounting bracket 8 also includes a bolt hole 14 that passes through an upper portion of the roll mounting bracket 8. A roll stopper bracket 12 is secured to the roll mounting bracket 8 by passing a bolt or other fastening member through fastening holes 20 of the roll stopper bracket 12 and the bolt hole 14 of the roll mounting bracket 8. Also, a plurality of powertrain mounting holes 22 is formed in the roll stopper bracket 12. The rear part of a powertrain housing is fixed to the powertrain mounting holes 22 of the roll stopper bracket 12.

A method of mounting a steering gearbox and a powertrain housing to the integral mounting structure described above will now be described.

With reference to FIG. 2, a column 24 of the steering gearbox is positioned in the cylindrical shape formed by the first concave portion 6 of the mounting seat 4 and the second concave portion 16 of the roll mounting bracket 8, after which the roll mounting bracket 8 is secured to the mounting seat 4 such that the roll mounting bracket 8 is fixed to the cross member 2. Preferably, a cylindrical bushing 26 is provided in the cylindrical shape formed by the first concave portion 6 and the second concave portion 16, the bushing 26 providing a predetermined level of cushioning. The column 24 of the steering gearbox is passed through the bushing 26. Accordingly, the bushing 26 acts as a guide for the column 24 and absorbs vibrations generated by the column 24 of the steering gearbox.

The roll mounting bracket 8 is preferably fixed to the mounting seat 4 of the cross member 2 by using bolts 9 that pass through the first mounting holes 10 of the mounting seat 4 to be screwed into the second mounting holes 18 of the roll mounting bracket 8. With this configuration, female threads are formed in the second mounting holes 18 of the roll mounting bracket. Also, openings 28 are formed in the cross member 2 as shown in FIG. 2 at portions corresponding to the first mounting holes 10 of the mounting seat 4. The openings 28 enable the positioning of the bolts through the first mounting holes 10, as well as easy access to the bolts using an appropriate tool.

After fixing the roll mounting bracket 8 to the mounting seat 4, the roll stopper bracket 12 is mounted to the roll mounting bracket 8. That is, the fastening holes 20 of the roll stopper bracket 12 are preferably fixed to the bolt hole 14 of the roll mounting bracket 8 by a bolt, 27, nut 29 and washer 31 combinations as shown in FIG. 1. With the roll stopper bracket 12 fastened to the roll mounting bracket 8, the rear part of the powertrain housing is mounted to the powertrain mounting holes 22 of the roll stopper bracket 12.

With the use of the integral mounting structure for a steering gearbox and powertrain of the present invention configured as in the above, the overall mounting structure is simplified, the free layout design is improved, production costs are minimized, the weight of the vehicle is reduced, and the durability of mounting members is enhanced. Further, since the bolts or other such fastening members used to secure the roll mounting bracket to the mounting seat are installed or removed from the bottom of the vehicle, convenient maintenance is possible.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An integral mounting structure for a steering gearbox comprising:

a mounting seat integrally formed on a cross member of a vehicle, the mounting seat including a first concave portion forming a half cylinder and first mounting holes formed on each side of the first concave portion;

a roll mounting bracket having second mounting holes through the roll mounting bracket is attached to the mounting seat using a fastener, a second concave portion forming a half cylinder such that the first concave portion of the mounting seat forms a full cylindrical shape with the second concave portion of the roll mounting bracket for accommodating a column of the steering gearbox, and a bolt hole passing through an upper portion of the roll mounting bracket; and a roll stopper bracket including fastening holes through which the roll stopper bracket is connected to the bolt hole of the roll mounting bracket, and a plurality of powertrain mounting holes for mounting a rear part of a powertrain housing.

2. The integral mounting structure of claim 1 wherein a bushing is provided in the full cylindrical shape.

3. The integral mounting structure of claim 2 wherein the bushing is made of a material for providing cushioning to the column of the steering gearbox.

4. The integral mounting structure of claim 1 wherein the roll stopper bracket is connected to the bolt hole of the roll mounting bracket using a bolt, nut and washer assembly.

5. The integral mounting structure of claim 1 wherein the second mounting holes are formed with female threads, at a predetermined distance inward from an end contacting the mounting seat, and openings are formed in the cross member at portions corresponding to the formation of the first mounting holes of the mounting seat such that fasteners can be inserted through the openings to pass through the first mounting holes and be screwed into the second mounting holes.

* * * * *